Aug. 31, 1943.  A. M. YOUNG  2,328,046
TOASTER
Filed Dec. 8, 1941
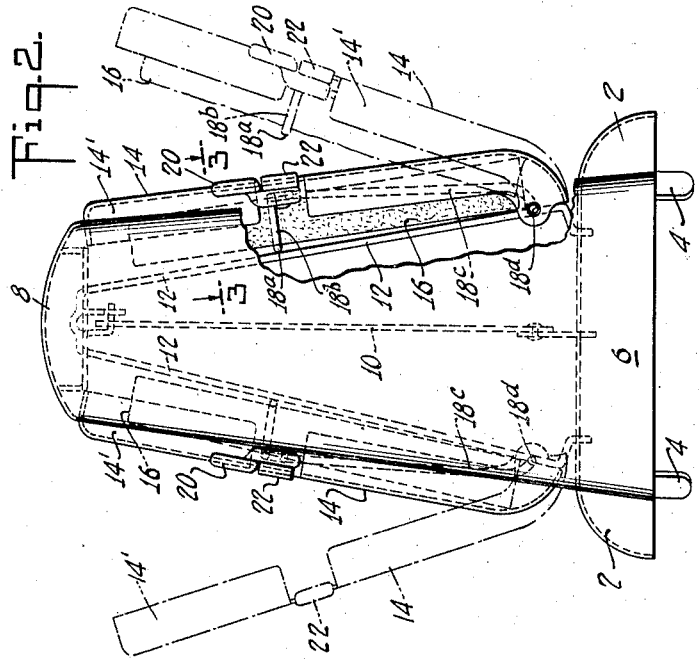
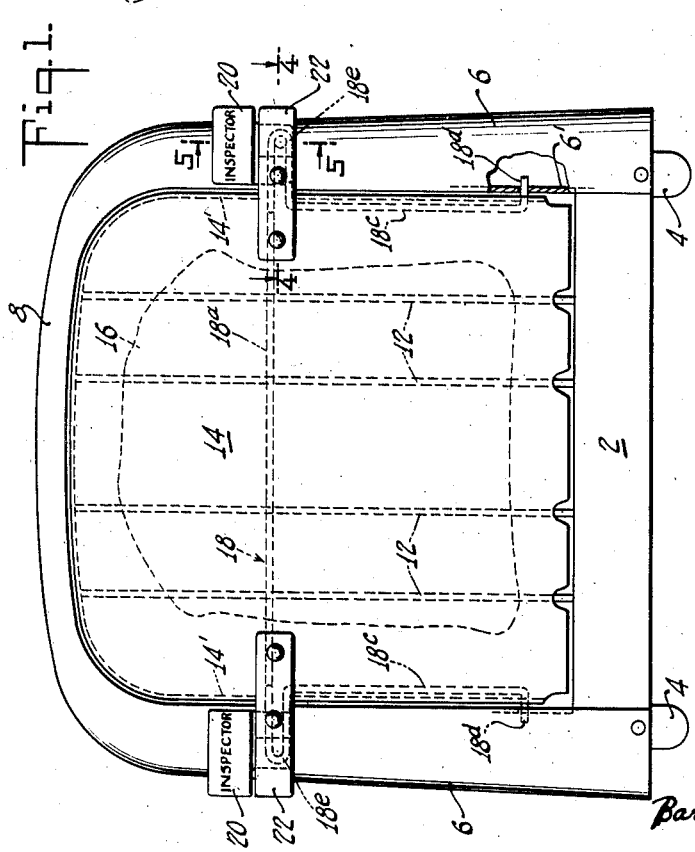
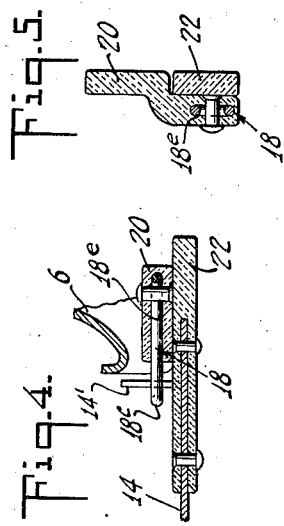
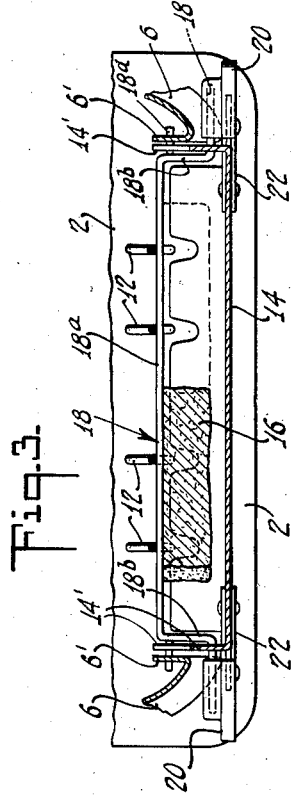
INVENTOR
ALLAN M. YOUNG
BY
Bartlett, Eyre, Keel & Weymouth
ATTORNEYS Patented Aug. 31, 1943

2,328,046

UNITED STATES PATENT OFFICE 2,328,046

TOASTER

Allan M. Young, Meriden, Conn., assignor to Manning, Bowman & Co., Meriden, Conn., a corporation of Delaware Application December 8, 1941, Serial No. 422,019

7 Claims. (Cl. 53—5)

My present invention relates to electric toasters and more particularly to the type known as "tip and turn" toasters, that is, to the type in which the bread or toast is automatically turned to present the other surface to the heat whenever the doors, or lids, are opened.

In the usual toaster of this type, there is a central heating device with accommodation for bread on opposite sides thereof and the bread is held in toasting relation to the heating device by side doors or lids which are hinged at their lower edges to the framework of the toaster. One drawback of this type of toaster is the difficulty encountered when one wants to inspect the toast to see if further toasting is required. As the toast reverses itself when the lid is opened, the side presented to view is the untoasted side, or the side previously toasted if the lid has been previously opened, with the result that a further closing and opening of the lid is required in order to see the condition of the toast.

The principal object of the present invention is thus to provide, in a toaster of this general type, means for readily inspecting the toast at any time by a simple opening of the lid and without interference with the normal operation of the toaster when turning of the toast is desired.

A further object of the invention is to provide inspection means for a tip and turn toaster that will be simple of construction and easy and safe in operation.

For an understanding of the invention reference may be had to the accompanying drawing, of which:

Fig. 1 is a side view of a toaster embodying the invention;

Fig. 2 is an end view, partly in section, of the toaster of Fig. 1 showing, in dotted positions, one lid opened for inspection of the toast and the other lid opened for reversal of the toast;

Fig. 3 is a sectional view taken on the line 3—3 of Fig. 2; and

Figs. 4 and 5 are enlarged sectional views of parts of the toaster taken on the lines 4—4 and 5—5 of Fig. 1, respectively.

As shown in the drawing, the toaster includes a conventional base 2, having legs 4, preferably of insulating material, and carrying a framework including vertical end walls 6, and top wall 8. In the particular embodiment of the invention illustrated end walls 6 and top wall 8 are formed of a single sheet of metal with the walls 6 curved outwardly along their central section and folded inwardly along their vertical edges to provide flanges 6'. A conventional heater wire, not shown, is wound about a central vertical sheet 10 of mica or the like supported between the base 2 and the upper end of the conventional guard wires 12. Pivoted doors or lids 14 having inturned flanges 14' define with the wires 12, the heating chambers for the bread 16 to be toasted. In accordance with the invention, there is provided a pair of wires or rods 18 each of which has a stretch 18a which extends lengthwise of the heater adjacent the wires 12, stretches 18b at right angles to stretch 18a and parallel to the flanges 14' of the lids and stretches 18c which extend downwardly to outwardly turned ends 18d. The ends 18d of each wire 18 pass through mating holes in the flanges 14' and 6' of the lids 14 and side walls 6 respectively and serve as pivots for the lids 14 and the wire 18. Each wire 18 intermediate the stretches 18b and 18c are bent into loops 18e which are embedded within blocks 20, preferably of molded insulating material, one surface of each of which engages the inner surface of a finger-piece 22 mounted on the side edge of the lid 14.

Each block 20, in the particular embodiment of the invention illustrated is formed with a part having a surface above and substantially flush with the outer surface of the finger-piece 22, and the part within which the loop 18e is embedded and which engages the finger-piece is relatively narrower than the finger-piece, as shown best in Figure 4, to permit independent operation of the finger tip 22 or joint operation with the member 20 as desired.

In operation the bread 16 to be toasted is first inserted into the heating chamber in the usual way, the operator opening the lid by means of the finger-piece 22 and moving it away from the inspector grip 20, as shown in dotted lines at the left in Fig. 2. The bread 16 is thus positioned between the lid 14 and the horizontal stretch 18a of the wire 18. During the heating operation, if inspection without turning the toast is desired, the operator grips the inspector 20 and the finger-piece 22 between his thumb and finger and opens the lid. The toast 16 will thus be held adjacent the lid by the wire 18, as shown in dotted lines at the right in Fig. 2, with the result that the toast cannot turn and the side thereof adjacent the heater may be inspected. When turning of the toast is desired the lid is opened by the piece 22 and the toast slides down the lid and turns in the usual manner.

From the above description it will be apparent that the invention provides an exceedingly simple yet efficient means for ready inspection of toast in a tip and turn type toaster. Although the invention has been described in connection with one specific embodiment thereof, obviously various changes in the construction illustrated could be made without departing from the invention. For example, although two inspector grips have been shown associated with each lid, one only for each lid could be employed if desired. Also, the particular shape of inspector grip disclosed could be varied according to taste so long as it permitted independent operation of the lid or joint operation thereof with the inspector grip. The particular location vertically of the horizontal stretch 18a of the wire is immaterial so long as the purpose of holding the toast adjacent the lid during inspection is achieved.

I claim:

1. In an electric toaster, a base support, a frame mounted thereon including end walls, upwardly extending spacer wires on said base support, an inspection device pivotally mounted in said end walls adjacent the base support and having a part thereof contacting said spacer wires, a lid pivotally mounted for conjoint rotation with said inspection device and on the same axis therewith to toast removing position or for rotation independently thereof to the same position, said lid and spacer wires defining a toast reception chamber and being so shaped as to cause the bread to be toasted to slide down into the lid when the lid is rotated alone to such toast removing position, and finger engaging means on said lid and on said inspection device for opening said lid independently of or together with said inspection device.

2. In an electric toaster of the type having a side lid pivoted at its lower edge for retention of bread to be toasted in the heating chamber when the lid is closed and for reversal of the toast when the lid is fully opened and then reclosed, the improvement which comprises an inspection device for optionally preventing turning of the toast when the lid is opened, said device comprising a member pivoted for rotation about the pivotal axis of the lid and having a part thereof spaced inwardly of the lid for reception of the bread therebetween and having means optionally engageable by the operator for conjoint rotation of the device with the lid to fully open position.

3. An electric toaster comprising in combination a base, a frame mounted thereon and inclosing a heating chamber for bread, an elongated inspection member pivoted at its ends in said framework adjacent the base, said member having a horizontal stretch within the heating chamber for engagement with the inner surface of the bread to be toasted and having a portion extending laterally from said framework for engagement by the operator, a lid pivotally mounted on the ends of said inspection member, and a finger piece on said lid adjacent said extending portion of the inspection member whereby said lid and inspection member may be rotated together with the bread held therebetween to retract the bread from the heating chamber for inspection.

4. A toaster according to claim 3 including insulating means mounted on said extending portion of said inspection member and wherein said insulating means and said finger piece on said lid have engaging surfaces of different dimensions to facilitate independent operation of the lid and conjoint operation thereof with the inspection member.

5. In a tip and turn electric toaster having a lateral lid pivoted for opening about a horizontal axis adjacent its lower edge and having a pair of finger pieces thereon for opening the same, an inspection member associated with the lid, said member being pivoted for rotation about the same horizontal axis as the lid, and including finger pieces adjacent the finger pieces of the lid, said lid and inspection member when rotated together holding the bread to be toasted therebetween for inspection of the bread without turning, said inspection member comprising a single length of wire having loops therein forming the finger pieces and connected by a horizontal stretch displaced inwardly from the lid to engage a surface of the bread to be toasted, said wire extending downwardly from the loops and terminating in portions extending along the horizontal axis of rotation of the wire.

6. An electric toaster comprising in combination a base, a framework mounted thereon and enclosing a toasting chamber, a lid having a finger piece thereon, an inspection member having a finger piece thereon positioned adjacent the finger piece of the lid, said lid and inspection member being pivoted on said frame for rotation about a common horizontal axis and through the same arc and said inspection member having a horizontal portion displaced inwardly of the lid for reception of bread to be toasted between the lid and said horizontal portion, said horizontal portion engaging a surface of the bread to be toasted and serving to prevent turning thereof when said member and lid are rotated together.

7. In an electric toaster of the type having a heating chamber and a lateral lid pivoted about a horizontal axis adjacent its lower end which, when closed, retains bread to be toasted with a surface thereof exposed to the heating chamber and which opens through an arc of more than 90 degrees to permit the bread to slide therein for exposure of the other surface to the heating chamber upon reclosure, the improvement which comprises an inspection member optionally rotatable with the lid about the same axis and through the same arc, said member having a part inwardly spaced from the lid for reception of the bread therebetween and for engagement with the inner surface of the bread during conjoint rotation with the lid to prevent the sliding of the bread into the lid.

ALLAN M. YOUNG.